Inventor
WALLACE W. TOMPKINS

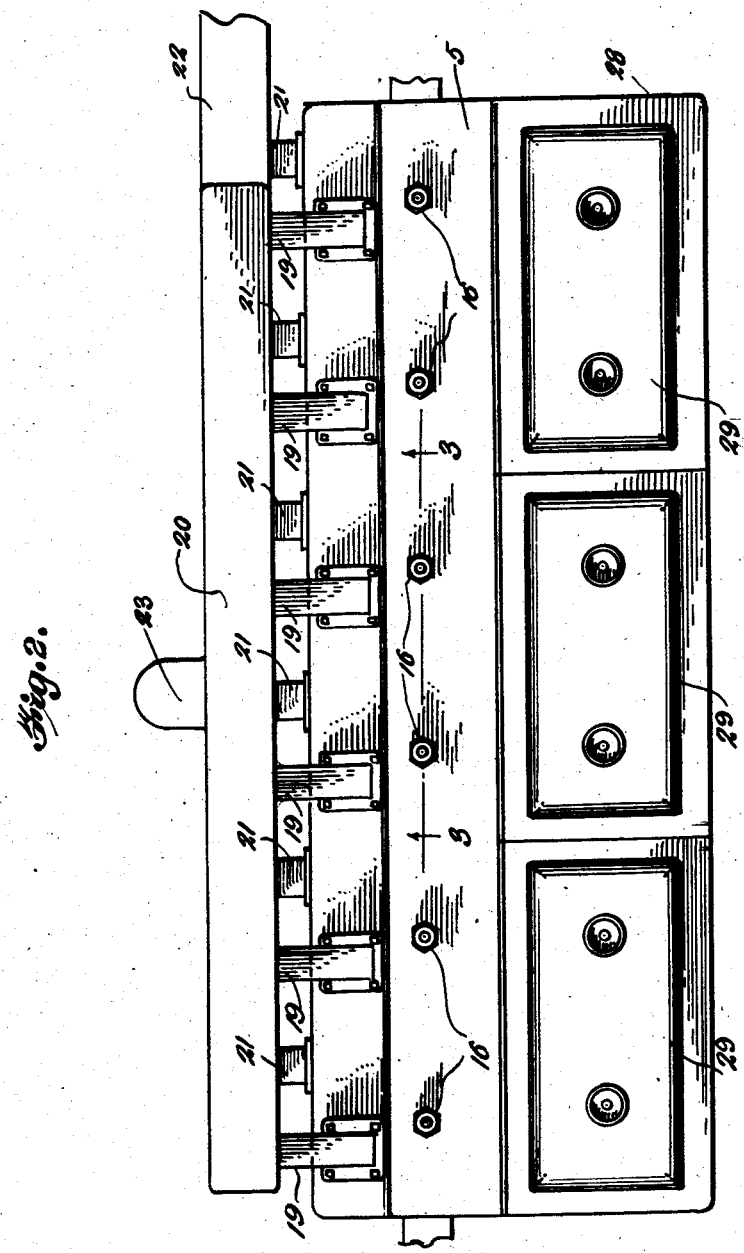

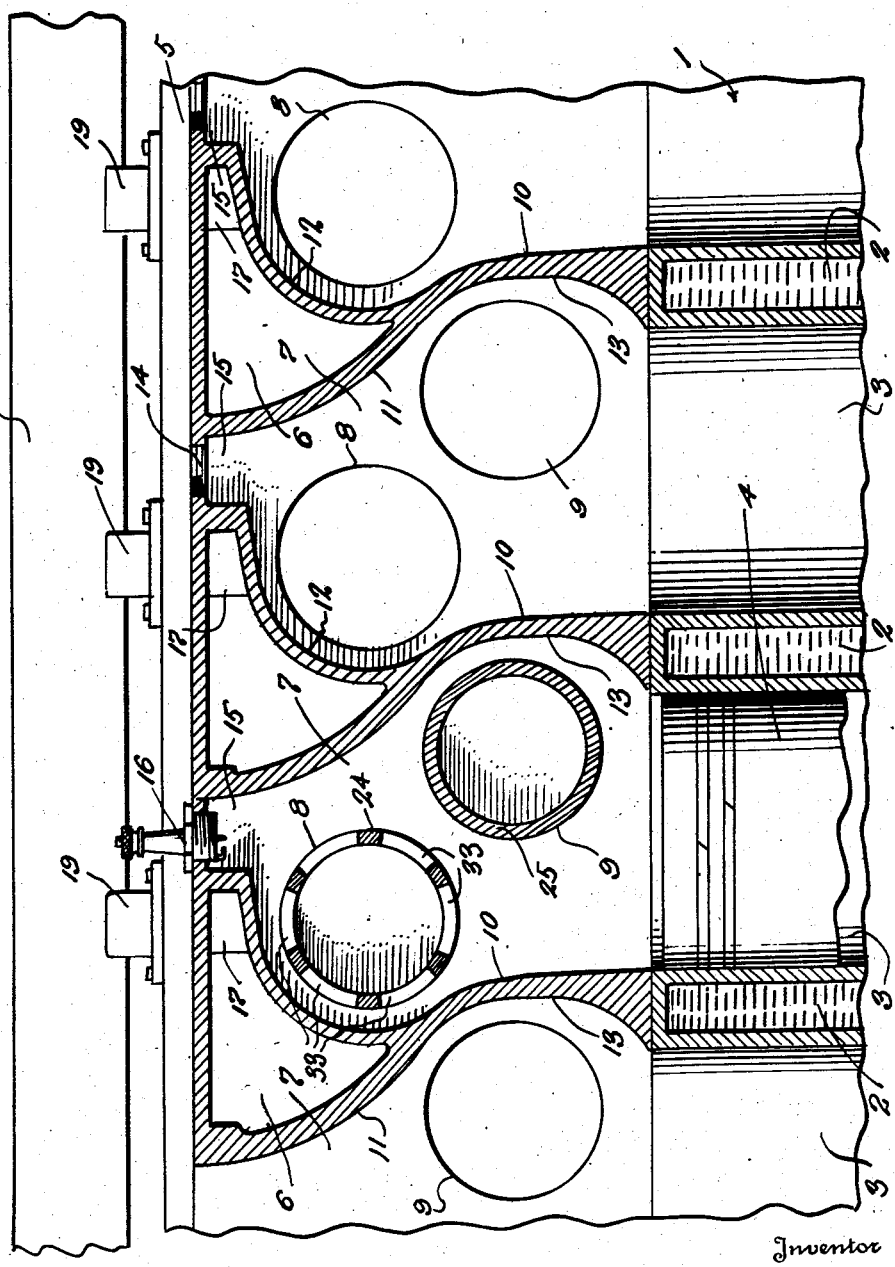

April 17, 1945. W. W. TOMPKINS 2,373,924
INTERNAL-COMBUSTION ENGINE
Filed Dec. 9, 1943 5 Sheets-Sheet 4
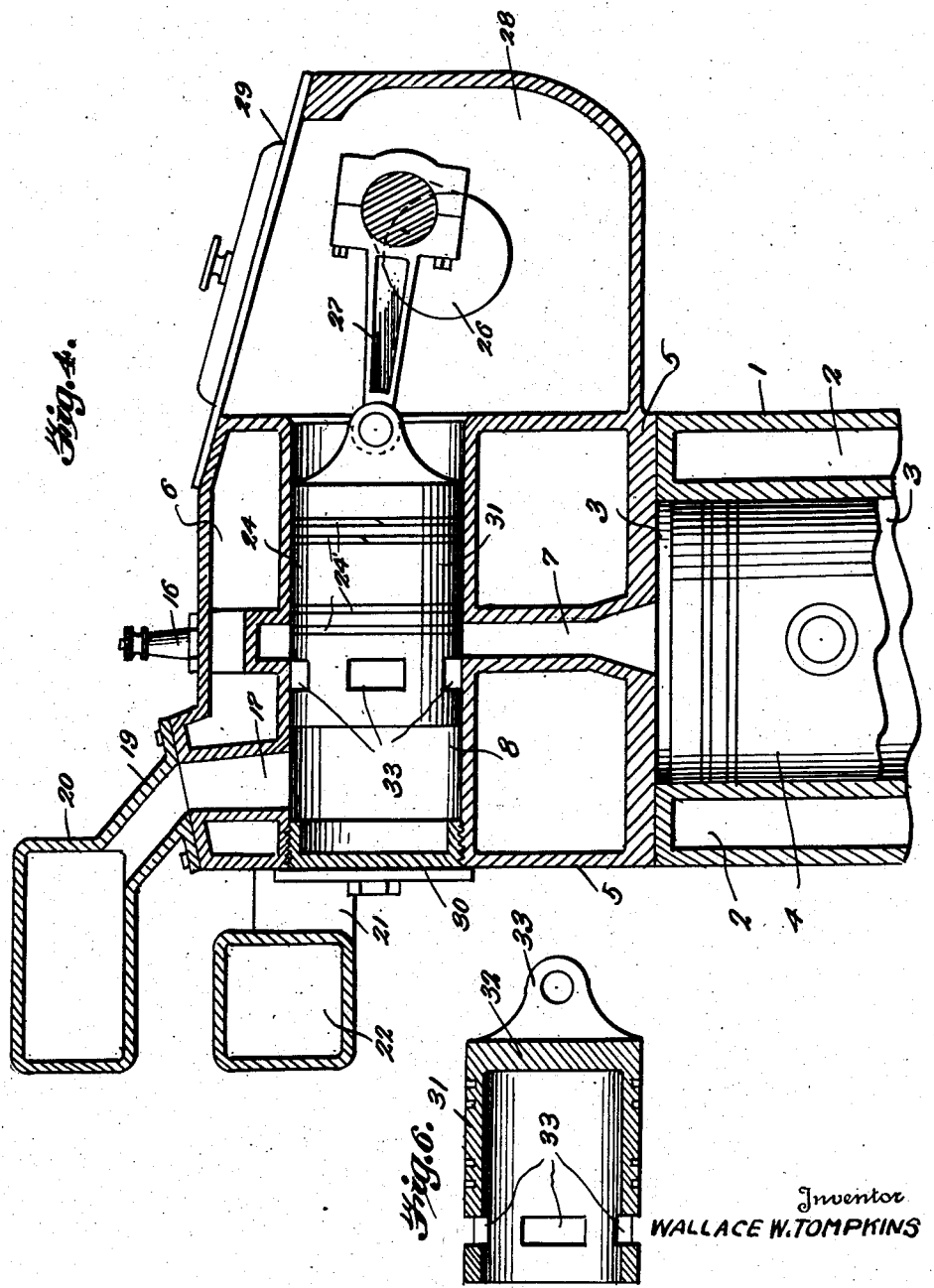
Inventor
WALLACE W. TOMPKINS

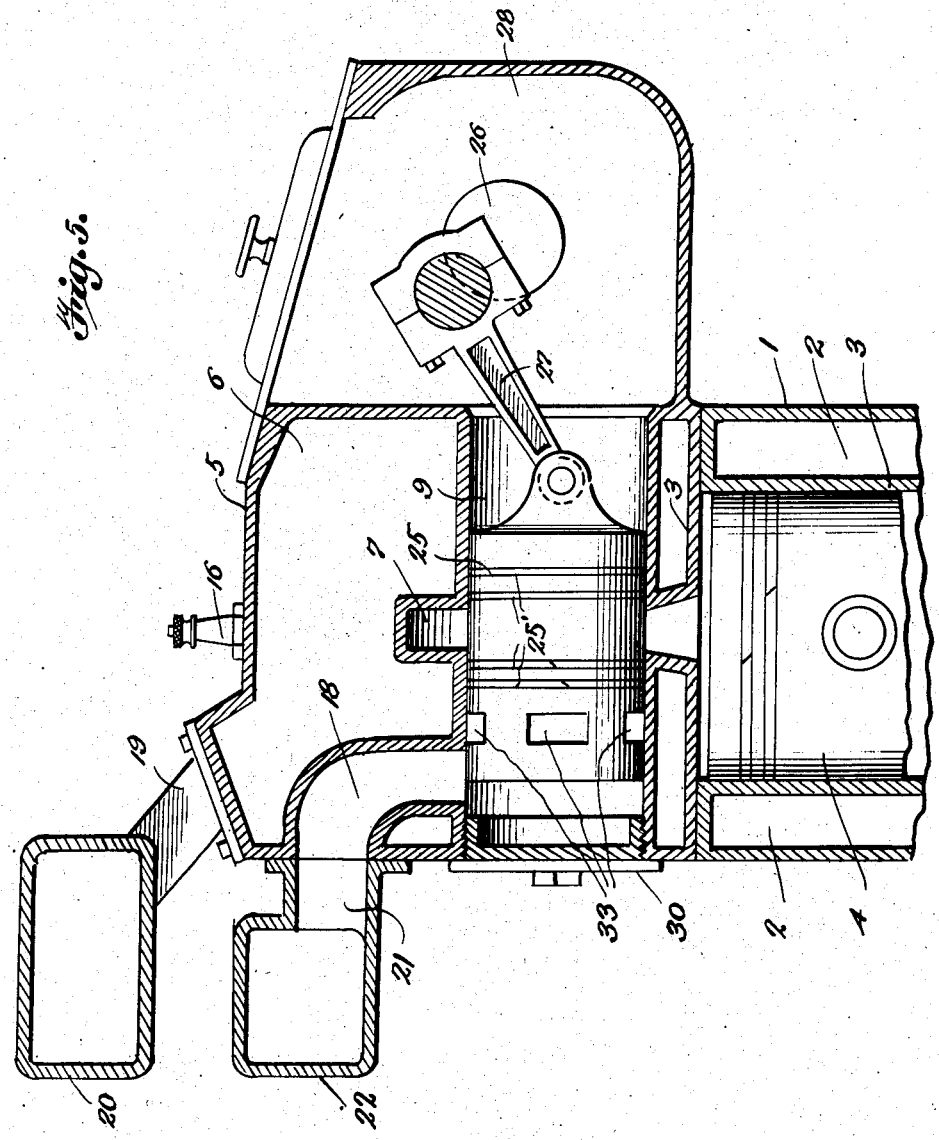

Patented Apr. 17, 1945

2,373,924

UNITED STATES PATENT OFFICE 2,373,924

INTERNAL-COMBUSTION ENGINE

Wallace William Tompkins, Ridgely, Md.

Application December 9, 1943, Serial No. 513,522

12 Claims. (Cl. 123—191)

This invention relates to internal combustion engines and more particularly to an engine having a cylinder block and a head carried thereby, the head being formed with combustion chambers over the cylinders of the block and there being provided intake valves and exhaust valves which are mounted in the head for reciprocating movement and operate through the combustion chambers.

One object of the invention is to provide an engine wherein the valves are in the form of hollow tubular valves which reciprocate transversely of the head and the combustion chambers and are mounted in cylindrical chambers surrounded by the combustion chambers and also surrounded by the water jacket of the head so that they will be cooled in a very effective manner.

Another object of the invention is to so arrange the valves that incoming fuel mixture will be heated by contact with the hot exhaust valves and, since it absorbs heat from the exhaust valves, serve as a cooling medium for the exhaust valves.

Another object of the invention is to so form the combustion chambers and so arrange the valves therein that incoming fuel will have turbulence imparted thereto and efficiency of the fuel increased.

Another object of the invention is to so form the combustion chambers that they extend longitudinally of the cylinders over which they are disposed, the valves being diagonally offset with respect to each other and thus reducing the depth of the engine head as well as permitting the incoming fuel mixture to have very effective contact with the outlet valves and walls of the chambers.

Another object of the invention is to so arrange the combustion chambers and the valves that each chamber extends in a vertical plane diametrically of the companion cylinder and the valves extend horizontally through the chambers transversely thereof.

Another object of the invention is to so form the valves that they have a pumping action when reciprocated and serve to suck charges of fuel inwardly from an intake manifold while opening and during closing serve to force surplus fuel back to the manifold and into another combustion chamber.

Another object of the invention is to so form the valve chambers and so mount the valves therein that the valves operate in cylindrical chambers extending transversely through the engine head and the combustion chambers and having a removable head at one end so that by removing the head access may be had to the valve chambers and carbon removed without dismantling the engine head or removing the valve.

Another object of the invention is to so mount the valves and so form and arrange the valve chambers and the chamber for the valve operating shaft that the valves may be individually removed for cleaning and replacement of sealing rings without removing the engine head from the cylinder block.

Another object of the invention is to provide an engine wherein the spark plugs and the manifolds are all carried by the engine head in such relation to the valve chambers that the valves may be removed without disturbing the manifold, the spark plugs or the wiring of the ignition system.

The invention is illustrated in the accompanying drawings, wherein:

Figure 2 is a top plan view of the improved engine.

Figure 3 is a fragmentary sectional view on an enlarged scale taken longitudinally of the engine on the line 3—3 of Figure 2.

Figure 4 is a transverse sectional view on an enlarged scale, taken transversely of the engine on the line 4—4 of Figure 1, the intake valve being shown in side elevation.

Figure 5 is a view similar to Figure 4, taken on the line 5—5 of Figure 1, the exhaust valve being shown in side elevation.

Figure 6 is a view showing one of the valves in longitudinal section.

Figure 1:
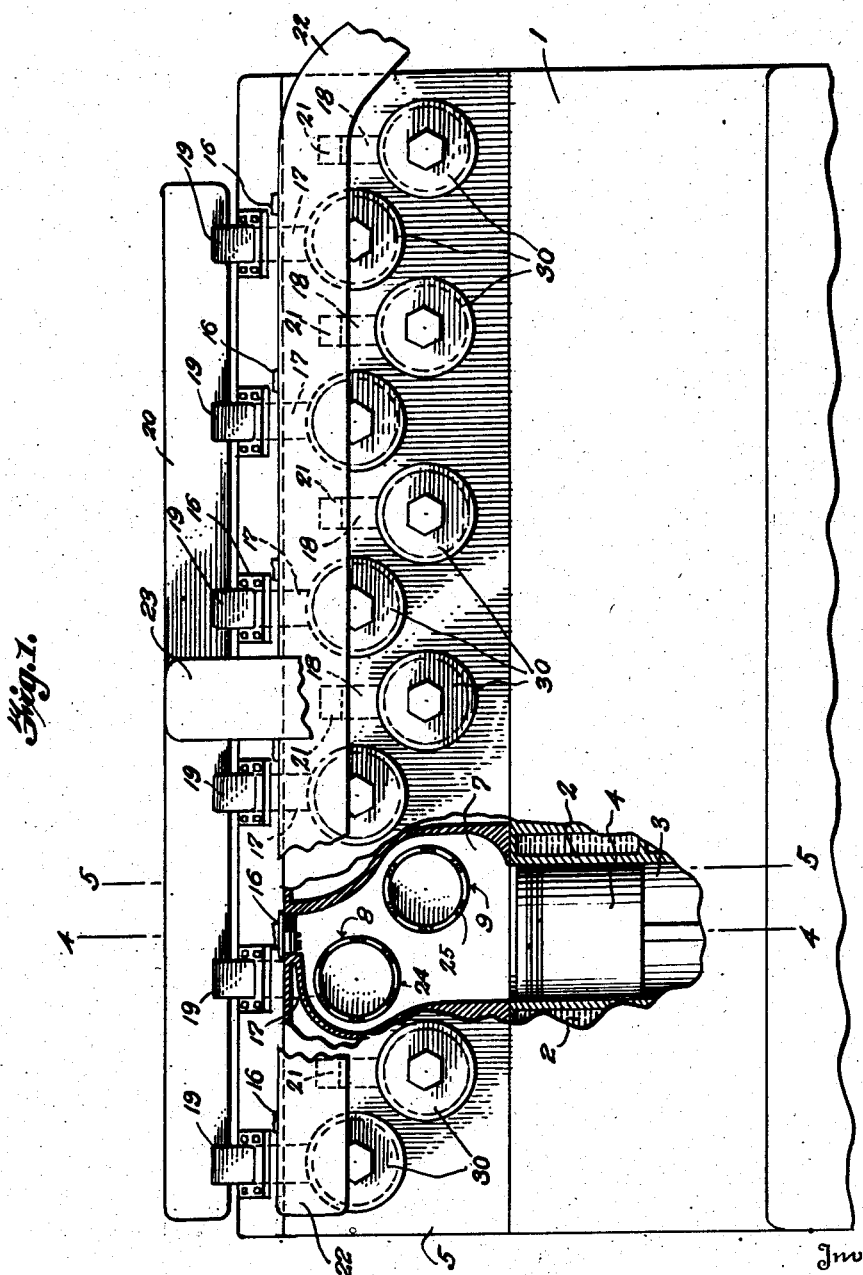
Figure 1 is a view showing an engine of the improved construction in side elevation with a portion in vertical section.

This improved engine has a block 1 which may be of any desired dimensions and is formed with the usual water jacket 2 surrounding vertically disposed cylinders. While six cylinders have been shown, it will be understood that any number of cylinders may be provided according to the size of the engine and that a piston 4 operates in each cylinder, the pistons being connected with the usual crank shaft (not shown).

The engine head block 5 rests upon the cylinder block 1 where it is removably secured in any desired manner, such as by screws or bolts, and sealed to prevent leakage between the block 1 and the head. The head 5 is formed with the usual water jacket 6 which surrounds combustion chambers 7 and also surrounds valve chambers 8 and 9 for cooling the same. A combustion chamber is disposed vertically over each of the cylinders 3 and extends diametrically of the cylinder in a plane longitudinally of the head 5. The combustion chambers are quite narrow, as shown in Figures 4 and 5, and each has edge walls 10 and 11 which are curved longitudinally and formed with offset vertically arcuate portions 12 and 13 which partially surround the valve chambers in spaced relation thereto, as shown in Figure 3. Openings 14 lead from reduced upper ends 15 of the combustion chambers to receive spark plugs 16 which project upwardly from the head 5 for engagement by wires of a conventional ignition system. Since the ignition chambers are open at their lower ends and communicate with the companion cylinders 3 for the full diameter thereof, an explosion of fuel in a combustion chamber may act upon the piston 4 in the companion cylinder and operate the piston for imparting rotary motion to the crank shaft of the engine.

The valve chambers 8 and 9 extend transversely of the head 5 and are in the form of cylinders which are open at both ends and bisected midway their length by the companion combustion chamber. Referring to Figures 1 and 3 of the drawings, it will be seen that, while the chambers 8 are in a higher plane than the chambers 9, the chambers 8 and 9 are in transversely offset relation to each other. Therefore, the lower portions of the chambers 8 and the upper portions of the chambers 9 will be in overlapped relation to each other and a head block 5 of short depth may be employed. Ports 17 and 18 extend upwardly from the valve chambers 8 and 9. The ports 17 open through the top wall of the head for communication with necks 19 of the intake manifold 20, while the ports 18 open through the outer side wall of the head for communicating with the necks 21 of the exhaust manifold 22. It will thus be seen that fuel delivered to the intake manifold from a carburetor through the neck 23, may flow from the manifold and into the valve chambers 8 for delivery into the combustion chambers and, after an explosion of fuel to impart driving force to the pistons 4, products of combustion may flow from the combustion chambers to the exhaust manifold for discharge therefrom.

Passage of fuel into the combustion chambers and from the combustion chambers is controlled by valves 24 and 25 which fit snugly within the valve chambers 8 and 9 and are connected with cranks of a valve-operating shaft 26 by pitman rods or links 27. The valve operated shaft extends longitudinally of the motor in a housing 28 at one side of the head block 5 and has its top closed by cover plates 29 which are removably secured so that they may be lifted from the housing when access is desired to the interior thereof for inspecting the shaft or detaching the links 27 from the valves. The valve chambers extend entirely through the head 5 from the housing 28 to the opposite side of the head and the last mentioned ends of the valve chambers, which may be referred to as their outer ends, are closed by caps 30 which are screwed into place and may be easily removed therefrom. By this arrangement, the caps may be removed and the walls of the valve chambers cleaned without removing the valves from the valve chambers, and, by removing the caps 30 and the cover plates 29, the valves may be detached from the links 27 and withdrawn for cleaning or replacement of their sealing rings 24' and 25' without disturbing the ignition wires or removing the head block 5 from the cylinder block.

The valves are of duplicate construction and each has a hollow cylindrical box 31 which is open at its front end, as shown in Figure 6, and closed at its rear end by a head 32 carrying an ear 33 to which the companion link 27 is pivotally connected. Openings or ports 33 are formed about the body 31 near the open front end of the valve, in spaced relation to each other circumferentially thereof, and the valves are of such length and the openings disposed in such spaced relation to the front ends thereof, that during operation of the engine, longitudinal reciprocation of the valves will move the openings into and out of registry with the combustion chambers. The cranks of the valve-operating shaft are so arranged that during operation of the engine the intake valve will first move to open position so that a charge of fuel may flow into the combustion chamber. The intake valves will then close and both valves remain closed during movement of the piston 4 in a compression stroke and in a power stroke, the exhaust valve then opening during a scavenging stroke of the piston, so that spent gases and products of combustion may be forced from the combustion chamber and out through the exhaust manifold. Attention is called to the fact that since the valves are hollow and reciprocated in the valve chambers, they will have a pumping action and exert suction on fuel in inlet manifold 20 to draw fuel into the valve chambers during opening movement. As the intake valves slide toward closed position and their ports pass out of registry with the combustion chambers, surplus fuel in the intake chambers 8 will be forced back into the intake manifold and through the manifold into the inlet chambers 8 of other cylinders and assist in charging a combustion chamber with fuel.

The arrangement of the valves relative to each other and the curvature of the edge walls of the combustion chambers is very important. This formation and arrangement of parts is shown clearly in Figure 3, and, referring to this figure, it will be seen that when the inlet valve is in open position, fuel will rush through the openings 33 into the combustion chamber and impinge against the curved surfaces 12 and 13 of the edge walls of the chamber and also make contact with the exposed portion of the outlet valve. Therefore, turbulence will be created and a very efficient fuel mixture formed. In addition to causing turbulence, contact of the incoming fuel with the outlet valve which is heated by the hot exhaust gases, causes the incoming fuel to be heated and, at the same time, contact of the incoming fuel with the outlet valve absorbs heat from the outlet valve and effects cooling of the outlet valve. The fact that the combustion chamber is of small cross sectional area when compared to the diameter of the cylinder 3 and the piston 4, causes the fuel to be highly compressed during a compression stroke of the piston and explode with great force when ignited by the spark plug.

Attention is also called to the fact that since the combustion chambers are entirely within the head block 5, the pistons 4 may operate for the full length of the cylinders 3 instead of their upward movement stopping in spaced relation to the upper ends of the cylinders.

It should also be noted that during a scavenging stroke, spent gases and other products of combustion are forced upwardly through the combustion chambers and through the hollow valves and the valve chambers to the discharge manifold. Since the valves are hollow and have heads 32 against which the exhaust gases impinge, the discharging gases tend to impart opening movement to the exhaust valves and increase the efficiency and operation of the valves.

Having thus described the invention, what is claimed is:

1. In an internal combustion engine, a cylinder block formed with vertically extending cylinders, a head block upon the cylinder block formed with vertical combustion chambers disposed over the cylinders and having their lower ends communicating with the cylinders, the combustion chambers being disposed in a plane extending diametrically of the cylinders and longitudinally of the head block, pairs of tubular valve chambers extending transversely through the head block, the chambers of each pair being bisected by a companion combustion chamber, one chamber of each pair having an inlet port and the other an outlet port, valves slidable in the valve chambers longitudinally thereof and transversely through the combustion chambers and formed with ports for communicating with the combustion chambers when the valves are in open position, means for reciprocating the valves in timed relation to each other, and means for exploding a fuel mixture in the combustion chambers.

2. In an internal combustion engine, a cylinder block formed with vertically extending cylinders, a head block upon the cylinder block formed with vertical combustion chambers disposed over the cylinders and having their lower ends communicating with the cylinders, tubular valve chambers extending transversely through the head block and arranged in pairs, each pair consisting of an inlet and an outlet chamber spaced transversely from each other and bisected by a companion combustion chamber, valves slidable longitudinally in said valve chambers, said valves having side openings for communicating with the combustion chambers, and means for imparting reciprocating motion to the valves and shifting them across the combustion chambers into and out of position for blocking communication between the valve chambers and the companion combustion chambers.

3. In an internal combustion engine, a cylinder block formed with vertically extending cylinders, a head block on the cylinder block formed with vertical combustion chambers disposed over the cylinders in a plane longitudinally of the head block and having their lower ends communicating with the cylinders, tubular valve chambers extending transversely through the head block and arranged in pairs, each pair consisting of an inlet chamber and an outlet chamber and being bisected by a companion combustion chamber and spaced transversely from each other, the combustion chambers and the valve chambers being surrounded by a water jacket in the head block, an intake manifold communicating with inlet chambers, an exhaust manifold communicating with outlet chambers, valves slidable longitudinally in the valve chambers and having portions passing transversely through the combustion chambers, each valve having a hollow cylindrical body closed at one end and having its other end open and facing the port of the chamber, walls of the valves being formed with circumferentially spaced side openings for communicating with the combustion chambers when the valves are shifted longitudinally to open position, and means connected with closed ends of the valves for imparting reciprocating movement to the valves.

4. In an internal combustion engine, a cylinder block formed with vertically extending cylinders, a head block on the cylinder block formed with vertical combustion chambers disposed over the cylinders diametrically thereof and having their lower ends communicating with the cylinders, said head block having a water jacket surrounding the valve chambers and the combustion chambers tubular valve chambers extending transversely through the head block and arranged in pairs, each pair consisting of an inlet chamber and an outlet chamber and being bisected by a companion combustion chamber and being spaced transversely from each other and also spaced from side walls of the combustion chamber, an intake manifold communicating with inlet chambers, an exhaust manifold communicating with outlet chambers, valves slidable longitudinally in the valve chambers and across the combustion chambers, said valves having pumping action when reciprocated in the valve chambers whereby fuel will be drawn from the inlet manifold during movement of an inlet valve in one direction and surplus fuel forced back into the inlet manifold during movement of the inlet valve in an opposite direction, and means for imparting reciprocating movement to the valves in timed relation to each other.

5. In an internal combusiton engine, a cylinder block formed with vertically extending cylinders, a head block upon the cylinder block formed with combustion chambers disposed vertically over the cylinders in a plane extending longitudinally of the head block with their lower ends communicating with companion cylinders, valve chambers extending transversely through the head block between opposite sides thereof and arranged in pairs, each pair being disected by a companion combustion chamber for communication therewith, one valve chamber of each pair constituting a fuel inlet chamber and the other an exhaust chamber spaced transversely from the companion inlet chamber, valves slidable longitudinally through the valve chambers, removable closures for ends of the valve chambers at one side of the head block, the valves having open ends facing closed ends of the valve chambers and being formed with side openings for registering with the combustion chambers, and actuating means at the opposite side of the head block connected with closed ends of the valves for imparting reciprocating movement to the valves and moving the valves into and out of position for blocking communication between the valve chambers and the companion combustion chambers.

6. In an internal combustion engine, a cylinder block formed with vertically extending cylinders, a head block upon the cylinder block formed with combustion chambers disposed vertically over the cylinders in a plane extending longitudinally of the head block with their lower ends communicating with companion cylinders, valve chambers extending transversely through the head block and arranged in pairs, each pair being bisected by a companion combustion chamber for communication therewith, one chamber of each pair constituting a fuel inlet chamber and the other an exhaust chamber, valves slidable longitudinally through the valve chambers into and out of closed position for blocking communication with the combustion chambers, removable closures for ends of the valve chambers at one side of the head block, said valve chambers having side ports between the valves and closed ends of the valve chambers, and valve-actuating means at the other side of the head block.

7. In an internal combustion engine, a cylinder block formed with vertically extending cylinders, a head block on the cylinder block formed with combustion chambers disposed vertically over the cylinders in a plane extending longitudinally of the head block with their lower ends communicating with companion cylinders, valve chambers extending transversely through the head block and arranged in pairs, each pair being bisected by a companion combustion chamber for communication therewith, the companion valve chambers being spaced transversely from each other and one constituting a fuel inlet chamber and the other an exhaust chamber, the combustion chambers and the valve chambers being surrounded by a water jacket of the head block, valves slidable longitudinally through the valve chambers into and out of closed position for blocking communication with the combustion chambers, removable closures for ends of the valve chambers at one side of the head block, said valve chambers having side ports located between their closed ends and confronting ends of the valves, a housing at the other side of the head block extending longitudinally thereof, and communicating with the valve chambers through open ends thereof a crank shaft extending longitudinally in said housing and rotatably mounted, and rods carried by the crank shaft and pivotally connected with the valves through open ends of the valve chambers for reciprocating the valves and moving same to open and closed positions in time relation to each other.

8. In an internal combustion engine, a cylinder block formed with vertically extending cylinders, a head block on the cylinder block formed with combustion chambers disposed vertically over the cylinders in a plane extending longitudinally of the head block with their lower ends communicating with companion cylinders, valve chambers extending transversely through the head block and arranged in pairs, each pair being bisected by a companion combustion chamber for communication therewith and constituting a fuel inlet chamber and an exhaust chamber, valves slidable longitudinally through the valve chambers the valve chambers being spaced transversely from each other and so arranged that incoming fuel will strike the exhaust valves to effect heating of the incoming fuel and cooling of the exhaust valves, and means for imparting reciprocating movement to the valves and shifting the valves into and out of closed position.

9. In an internal combustion engine, a cylinder block formed with vertically extending cylinders, a head block on the cylinder block formed with combustion chambers disposed vertically over the cylinders in a plane extending longitudinally of the head block with their lower ends communicating with companion cylinders, valve chambers extending transversely through the head block and arranged in pairs, each pair being bisected by a companion combustion chamber for communication therewith and constituting a fuel inlet chamber and an exhaust chamber, valve slidable longitudinally through the valve chambers, the valve chambers being spaced transversely from each other and in vertical offset relation to each other and adjoining portions of walls of the combustion chambers being arcuate vertically and extending in spaced substantially parallel relation to the circumference of exposed portions of the valves whereby fuel entering the combustion chambers through the inlet valves will be heated and have turbulence imparted thereto by contact with the outlet valves and arcuate portions of walls of the combustion chambers, and means for imparting reciprocating movement to the valves and shifting same longitudinally into and out of closed and open positions.

10. In an internal combustion engine, a cylinder block formed with vertically extending cylinders, a head block on the cylinder block formed with combustion chambers disposed vertically over the cylinders in a plane extending longitudinally of the head block with their lower ends communicating with companion cylinders, valve chambers extending transversely through the head block and arranged in pairs, each pair being bisected by a companion combustion chamber for communication therewith, the valve chambers of each pair being spaced transversely from each other and one constituting a fuel inlet chamber and the other an exhaust chamber, said head block having a water jacket surrounding the valve chambers and the combustion chambers, valves slidable longitudinally through the valve chambers, the combustion chambers being tapered toward their upper ends and having portions of their walls arcuate vertically and extending in spaced and substantially parallel relation to portions of the valves passing through the combustion chambers, means for reciprocating said valves and moving the valves into and out of open and closed positions in timed relation to each other, and spark plugs at the upper ends of the combustion chambers.

11. In an internal combustion engine, a cylinder block having vertical cylinders therein, a head block on the cylinder block formed with vertically disposed combustion chambers over the cylinders and transversely extending valve chambers arranged in pairs, each pair being intersected by a companion combustion chamber, valves slidable longitudinally in the valve chambers, one valve chamber of each pair being an inlet chamber and the other an exhaust chamber and arranged opposite the inlet chamber whereby incoming fuel may strike the exhaust valve to cool the exhaust valve and be heated by contact with the exhaust valve, means for reciprocating the valves in timed relation to each other, and means for igniting fuel in the combustion chambers.

12. In an internal combustion engine, a cylinder block having vertical cylinders therein, a head block on the cylinder block formed with vertically disposed combustion chambers over the cylinders and transversely extending valve chambers arranged in pairs and open through opposite sides of the head block, each pair being intersected by a companion combustion chamber, and spaced transversely from each other, valves slidable longitudinally in the valve chambers, one valve chamber of each pair being an inlet chamber and the other an exhaust chamber, removable plugs closing ends of the valve chambers at one side of the head block, said valves being hollow and each closed at one end and having its other end facing the closed end of the valve chamber and formed with side ports for registering with the companion combustion chamber during reciprocation of the valves, the closed end of the exhaust valves being acted upon by escaping spent gases filling the valve through the open end thereof during scavenging of the combustion chambers to urge the valves toward open position, and actuating means for the valves disposed at one side of the head block and connected with closed ends of the valves.

WALLACE WILLIAM TOMPKINS.